(12) United States Patent
Verbrugge et al.

(10) Patent No.: US 8,265,139 B2
(45) Date of Patent: Sep. 11, 2012

(54) PACKET COMPARATOR

(75) Inventors: David Verbrugge, Caldeon (CA); Brian E. Crookes, East York (CA)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 12/339,647

(22) Filed: Dec. 19, 2008

(65) Prior Publication Data

US 2009/0168867 A1 Jul. 2, 2009

Related U.S. Application Data

(60) Provisional application No. 61/018,596, filed on Jan. 2, 2008, provisional application No. 61/025,888, filed on Feb. 4, 2008.

(51) Int. Cl.
*H04N 7/12* (2006.01)
(52) U.S. Cl. ............. 375/240.01; 375/240.13; 375/130; 705/500
(58) Field of Classification Search ........ 375/130–153, 375/240.08, 240.01, 240.13; 704/500–502
See application file for complete search history.

(56) References Cited

U.S. PATENT DOCUMENTS

| | | | |
|---|---|---|---|
| 6,226,769 B1 * | 5/2001 | Schuster et al. | 714/752 |
| 6,904,040 B2 * | 6/2005 | Salapura et al. | 370/395.32 |
| 7,400,681 B2 * | 7/2008 | Joch et al. | 375/240.16 |
| 7,746,928 B2 * | 6/2010 | Wang et al. | 375/240.03 |
| 7,916,952 B2 * | 3/2011 | Demos | 382/232 |
| 8,144,791 B2 * | 3/2012 | Jung et al. | 375/240.28 |
| 8,155,181 B2 * | 4/2012 | Han et al. | 375/240.01 |
| 8,155,189 B2 * | 4/2012 | Yan | 375/240.13 |
| 2005/0152448 A1 * | 7/2005 | Crinon et al. | 375/240.01 |
| 2007/0237185 A1 * | 10/2007 | Pereira et al. | 370/503 |
| 2008/0181258 A1 * | 7/2008 | Tomizawa | 370/516 |
| 2008/0232459 A1 * | 9/2008 | Auyeung | 375/240.01 |
| 2009/0003459 A1 * | 1/2009 | Limberg | 375/240.26 |
| 2009/0147954 A1 * | 6/2009 | Pinder et al. | 380/216 |

FOREIGN PATENT DOCUMENTS

| | | |
|---|---|---|
| EP | 0 782 346 A | 7/1997 |
| GB | 2 395 096 A2 | 5/2004 |

OTHER PUBLICATIONS

Deng Pan, Yuanyuan Yang; FIFO-Based Multicast Scheduling Algorithm for Virtual Output Queued Packet Switches; Oct. 2005; IEEE; vol. 54; pp. 1-15.*

Liang Longfei, Yu Songyu, Wang Xingdong; Implementation of a New MPEG-2 Transport Stream Processor for Digital Television Broadcasting; Dec. 2002; IEEE; vol. 48; pp. 1-5.*

* cited by examiner

*Primary Examiner* — Christopher Brown
*Assistant Examiner* — Fahimeh Mohammadi
(74) *Attorney, Agent, or Firm* — Tarolli, Sundheim, Covell & Tummino LLP (57) ABSTRACT

A packet comparator includes a match packet buffer and a first in first out (FIFO) buffer that stores a reference packet stream. Once a packet in the reference stream and a candidate stream are matched to the match packet, the reference stream and the candidate stream are considered synchronized. Thereafter, the two streams are passed through a compare function and a resultant stream is output from the packet comparator. Possible resultant streams include the results of an exclusive OR (XOR) operation between all, or selected parts, of packets in each of the streams.

27 Claims, 3 Drawing Sheets

PACKET COMPARATOR

This application claims the benefit of U.S. Provisional Application No. 61/018,596, filed Jan. 2, 2008, and the benefit of U.S. Provisional Application No. 61/025,888, filed Feb. 4, 2008, both of which are incorporated herein by reference in their entireties.

TECHNICAL FIELD

The present disclosure relates to systems and methods for comparing two separate packet streams.

BACKGROUND

It is not uncommon for original digital data streams (e.g., MPEG encoded video, or the like) to be manipulated for one purpose or another. Oftentimes, at some later time, a reverse manipulation of the manipulated data stream is applied to obtain the original data stream. For example, the original data stream may be encapsulated in unique ways for transport across a selected electronic network. In the case of MPEG video, it is important that a downstream MPEG decoder obtain the original MPEG compliant data stream so that the intended video imagery can be properly displayed. Disruptions and errors in the data stream can result in lost packets, leading to lost frames, and/or total loss of signal.

It is accordingly important to ensure that data streams that are manipulated are successfully "un-manipulated" such that an original data stream can be obtained.

DESCRIPTION OF EXAMPLE EMBODIMENTS

Overview

Briefly, the embodiments of the present invention include system and methods that perform the steps of adding a "match packet" to a reference stream, receiving the reference stream including the match packet, detecting the match packet in the reference stream, detecting the match packet in a candidate stream, wherein the candidate stream is a processed version of the reference stream and is delayed in time with respect to the reference stream, upon detection of the match packet in both the reference stream and the candidate stream, changing a register state to a synchronization state, when in the synchronization state, comparing respective individual packets in the reference stream and the candidate stream to each other, and outputting a resultant stream indicative of the comparison.

In one embodiment, the reference and candidate streams are motion picture expert group (MPEG) compliant streams. The resultant stream may be one of several possible possibilities including the result of exclusive OR (XOR) operations on all or different portions of respective packets in each of the streams, or a synthesized stream that includes information about the comparison results.

Figure 1:
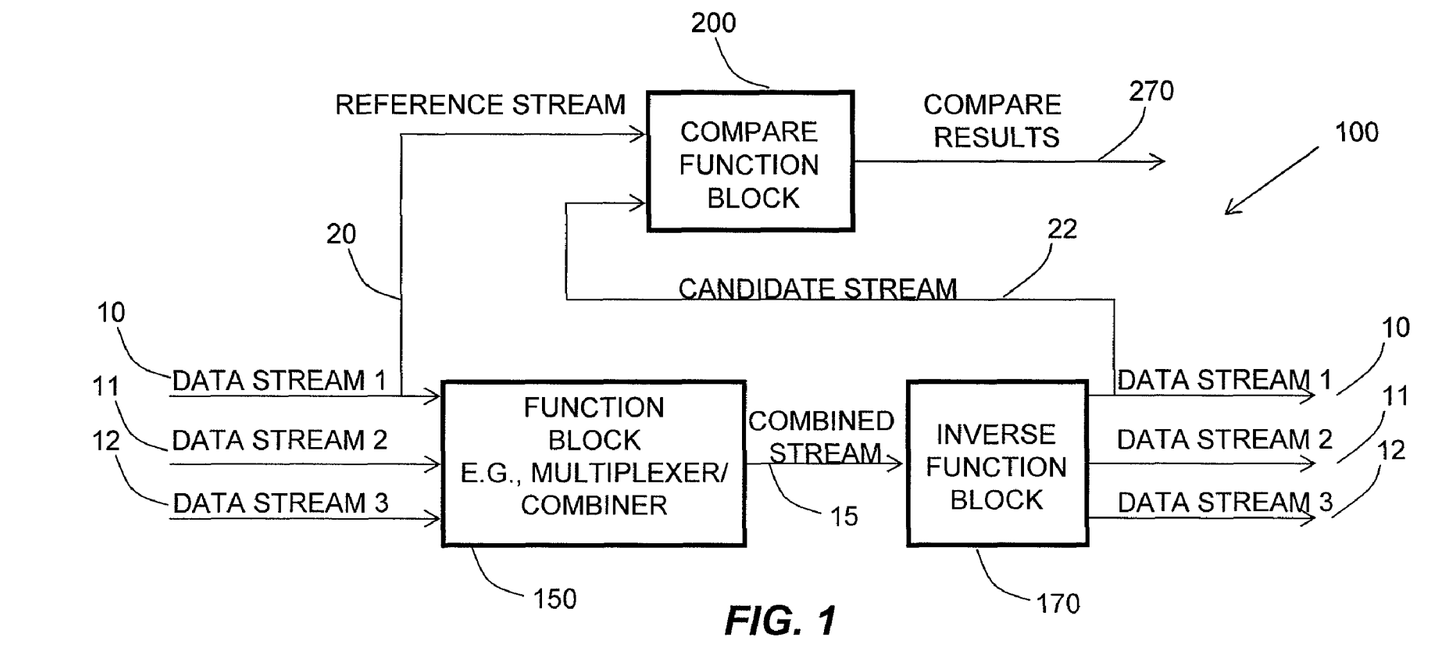
FIG. 1 is a block diagram of a system in accordance with an embodiment of the present invention.

FIG. 1 is a block diagram of a system 100 in accordance with embodiments of the present invention. Those skilled in the art will appreciate that FIG. 1 depicts only an example of one possible embodiment of the present invention and that other implementations and configurations are considered to be within the scope of the invention. As shown, several data streams 10, 11, 12 are provided to a function block 150. The data streams 10, 11, 12 may be, e.g., MPEG-compliant data streams or any other format known to those skilled in the art. Function block 150 can perform any number of functions including, but not limited to, multiplexing and/or combining the several data streams 10, 11, 12 to obtain, for example, a combined stream 15. This combined stream 15 is, in a typical case, expected to carry the same content represented by each of the individual data streams 10, 11, 12. Of course, combined stream 15 may not be of much use to, e.g., a conventional MPEG decoder, as such a device is expecting to receive a single data stream 10, 11 or 12, but not a "combined" version thereof.

To make the combined stream 15 useful (at least from the perspective of, e.g., a decoder) again, the inverse of the function block 150 is applied to the combined stream 15 in inverse function block 170. Inverse function block 170 is preferably able to "undo" the multiplexing and/or combining (or other data manipulation performed on data streams 10, 11, 12), and output the data streams 10, 11, 12 in their original form. In accordance with the present invention, a compare function is provided to confirm that a given one of the data streams 10, 11, or 12 is indeed identical to that same stream before function block 150 and inverse function block 170 were applied.

For a description of one possible function block 150 and inverse function block 170, reference is made to co-pending U.S. application Ser. No. 12/276,839, filed Nov. 24, 2008, entitled Secure Combined Interoperable Multiplexer, which is incorporated herein by reference. That application describes a digital transport formatter (DTF) and a multiple transport receiver (MTR) that correspond, respectively, to function block 150 and inverse function block 170. Other types of function blocks and inverse function blocks may be used in connection with embodiments of the present invention.

Figure 2:
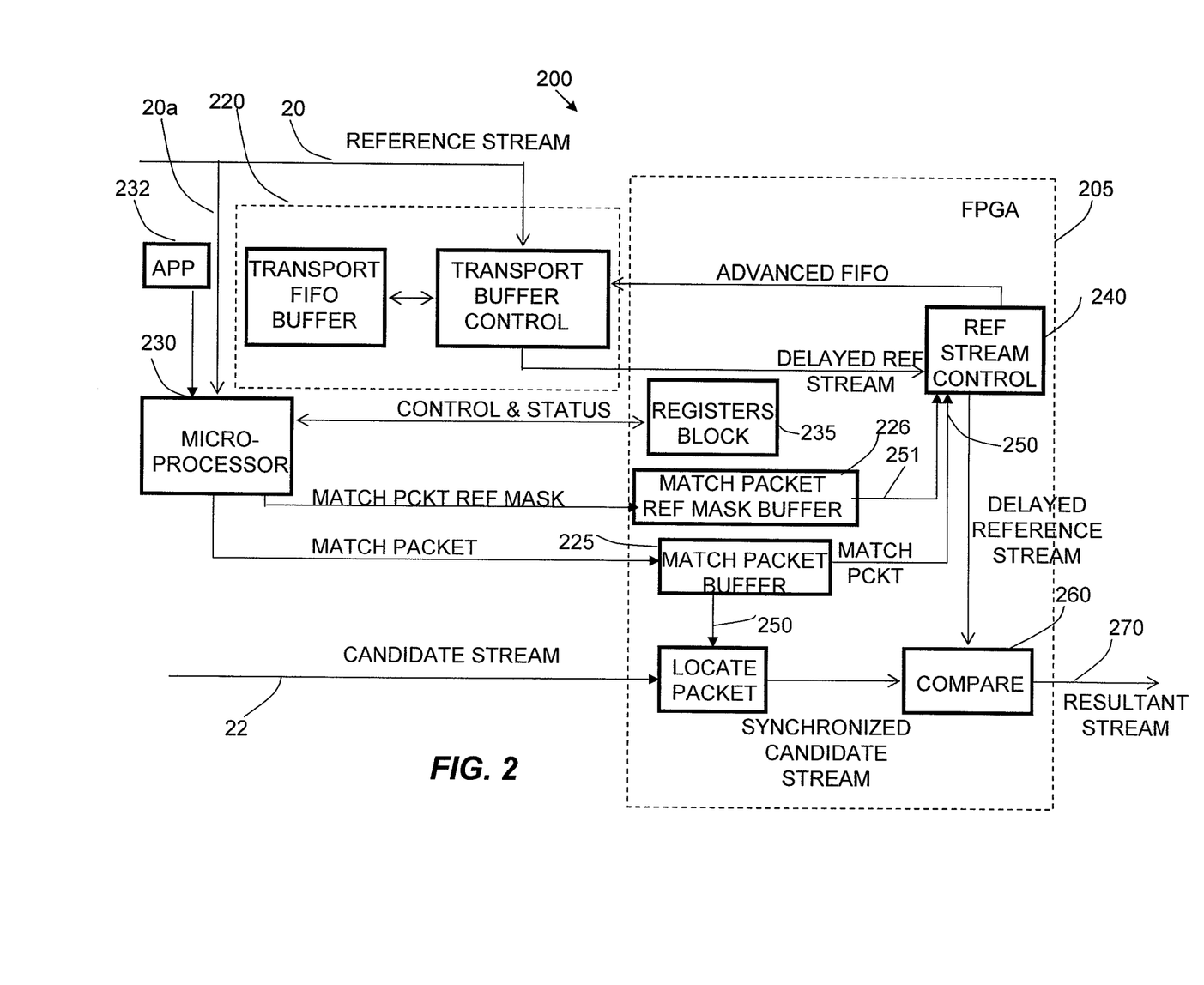
FIG. 2 depicts a packet comparator in accordance with an embodiment of the present invention.

FIG. 2 depicts a compare function block or "packet comparator" 200 in accordance with an embodiment of the present invention. In a preferred embodiment, packet comparator 200 is implemented using a field programmable gate array (FPGA) 205 and this FPGA is configured to compare two separate packet streams (namely reference stream 20 and candidate stream 22) and to generate statistics and measurements related to the comparison. The compare function is preferably enabled and disabled by a user software application 232, and further preferably operates under the direction of that application.

In a preferred embodiment, the reference packet stream 20 is capable of being used as a source for other processing and output routings regardless of the status and operation of the specific compare function 260. When routed to other processing functions or outputs of the FPGA 205, the original reference packet stream 20 is made available as input to the other processing functions and outputs without alterations or delays.

The reference stream 20 passes through a packet buffer FIFO (and associated controller) 220 prior to entry into the packet compare function 260. The packet buffer FIFO 220 provides packet buffer space to contain at least one full second of the reference stream. The packet buffer 220 is preferably controlled by the FPGA 205 and interfaces only to the FPGA. The buffer 220 may be internal or external to the FPGA 205.

It is noted that the reference stream 20 will normally be running a short time ahead of the candidate stream 22, since the candidate stream 22 is subjected to both function block 150 and inverse function block 170. The packet buffer FIFO 220 allows the reference stream 20 to be delayed by a variable amount so that it can be synchronized with the candidate stream 22 for comparison. The packet buffer FIFO 220 also provides a time delay for the application to find a suitable "match packet" 250 in the reference stream 20 and to start the compare process.

The FPGA 205 preferably provides a registers block 235, including match packet buffer 225, for microprocessor 230/application 232 to, among other things, write the contents of the match packet 250. The FPGA uses the match packet 250 to synchronize the reference stream 20 and the candidate stream 22 as directed by the application 232. The interface for writing the match packet 250 into the FPGA 205 preferably takes into account the "endianness" nature of the microprocessor 230 and the fact that packet streams are generally considered and treated as byte-wise serial data.

The FPGA 205 provides a match packet reference mask buffer 226 for application software operating on microprocessor 230 to write the contents of a "match packet reference mask" 251 into the FPGA 205. The match packet reference mask 251 allows application 232 controlled wild-card matches to be performed by the FPGA 205. Set bits in the reference mask may be considered as "always matching" by the FPGA 205 when it compares the match packet 250 to the reference stream 20. The default value of the match packet reference mask is all zero bits. The reference mask preferably has the same length and byte and bit order as the match packet 250. Any or all bits of the reference mask may be set by the application. To change the reference mask, the application must write the entire 188 bytes (i.e., the number of bytes in an MPEG-compliant packet) of the mask into the FPGA 205.

The match packet 250 and reference mask 251 can be written into the FPGA 205 by the application at any time when the packet comparator 200 is disabled, and at any time after enabling the packet comparator 200, but prior to the application 232 directing the FPGA 205 to attempt to find the match packet 250 in the reference stream 20. Packet comparator results 270 are not defined if any or all of the match packet 250 or reference mask are changed while the FPGA 205 is searching the reference stream 20 or candidate stream 22 for the match packet 250.

The FPGA 205 includes registers 235 to allow the application to direct the operation of the packet comparator 200 and to monitor its status. As noted, the application is configured to enable and disable the compare function of the packet comparator 200. When disabled, the compare function preferably does not signal status changes or interrupts to the application, nor does it affect any inputs or outputs. The FPGA registers block 235 may provide a control flag for the application 232 to start the packet compare process after the packet comparator 200 is enabled.

When transitioning from the disabled state to the enable state, the FPGA 205 preferably discards all previous contents of the packet buffer FIFO 220 and resets the packet comparator 200. The process of enabling and resetting the packet comparator 200 preferably does not change the contents of the match packet buffer 225 nor does it change the contents of the reference mask 251.

After the packet comparator 200 is enabled and reset, the FPGA 205 enables the reference stream 20 to pass into the packet buffer 220. This state is signaled to the application in the packet comparator status register 235. The FPGA 205 preferably does not attempt to find the match packet 250 in the reference stream 20 until directed to do so by the application. While in this state, the packet buffer 220 wraps to discard old packets as needed to make room for new packets from the reference stream 20. The FPGA 205 preferably does not exit this state until at least one of the following events occurs:

The packet comparator 200 is disabled
The application 232 directs the FPGA 205 to find the match packet 250 in the reference stream 20.

When suitably directed by the application 232, the FPGA 205 begins attempting to find the match packet 250 in the reference stream 20, taking into account the match packet reference mask which allows for wild-card matching of application 232 specified sections of the match packet 250 and reference stream packets 20. This state is signaled to the application in the packet comparator status register 235. While in this state, the packet buffer 220 continues to store incoming reference stream packets and wraps as needed to accommodate incoming packets. The packet buffer 220 may be controlled by reference stream control block 240.

The application then specifies to the FPGA 205 the maximum number of reference stream packets to be compared for the match packet 250. This value is stored, for example, in a 32-bit register. In accordance with an implementation of an embodiment of the present invention, a zero value in the register indicates to the FPGA 205 that an unlimited number of packets may be searched. If the maximum number of search packets is exceeded, the FPGA 205 updates its compare function status register 235 to signal a match failure to the application. The FPGA 205 is preferably able to generate an interrupt to the application upon match success or match failure.

When the match packet 250 is located in the reference stream, the FPGA 205 then configures itself to search for the matched reference packet in the candidate stream 22. The packet buffer 220 preferably continues to store incoming reference stream packets throughout the processing. The status register 235 may indicate this new processing state, the Synch state, to the application. The FPGA 205 writes the matched reference packet to a FIFO read register located in register block 235 to allow the matched reference stream packet to be read back by the application.

The application 232 may specify to the FPGA 205 the maximum number of candidate stream packets to be compared prior to finding a match. This maximum number is limited to the number of packets that can be contained in the packet buffer FIFO 220 but the application 232 may choose to specify a smaller number. If the comparison algorithm exceeds this number, the packet buffer 220 will no longer contain the matched reference packet from the reference stream 20. If the maximum number of candidate packets is compared without finding a match, the status register 235 preferably indicates a match failure to the application and the compare function stops processing until disabled and re-enabled. When the FPGA 205 locates the matched reference packet in the candidate stream 20, the FPGA begins draining the reference stream packet buffer FIFO 220 at the candidate stream bitrate and begins comparing packets between the two streams (at block 260), starting from the matched packet located in each stream. The compare function status register 235 may signal the match success to the application. The FPGA 205 is preferably configured to generate an interrupt to the application in the case of a match failure, or match success. The FPGA 205 also preferably provides a pair of registers for the application to read the latency delay, in packets, between the reference stream 20 and the candidate stream 22. The first register provides the latency observed upon entry into the synchronized condition, and the second register provides real-time latency during the synchronized condition (i.e. comparing).

The compare function 260 preferably performs a bit-by-bit comparison of the reference stream 20 and the candidate stream 22. After the reference stream 20 and candidate stream 22 compare has started, i.e., after the reference stream packet buffer 220 has been enabled to drain, the FPGA compare function 260 counts the total number of compared packets and the total number of mismatched packets. Registers containing these values are readable by the application at any time. The registers are zeroed at the same time when directed to be reset by the application.

The FPGA 205 interrupts the application 232 when the number of contiguous mismatched packets reaches an application specified level. The application 232 is preferably configured to reset the contiguous mismatched packet counter at any time. The counter is reset to zero when a good packet match occurs. The application is also preferably able to read the count of contiguous mismatched packets at any time. The application is further preferably able to enable and disable the interrupt signal. The event occurrence is preferably flagged by a status bit regardless of the interrupt enable/disable setting.

Once the comparator 200 has synchronized both streams, it generates a bit stream 270 that represents the comparison results. There are several possible resultant bit streams, any one of which may be selected by the application at any time. The compare result preferably is transmitted at the candidate stream bitrate.

The application 232 is preferably able to specify that adaptation field comparisons be suppressed. If adaptation field comparison is suppressed, the contents of adaptation fields may be considered to match if the packets being compared both contain an adaptation field and, further, that the adaptation fields are the same size. Adaptation field suppression affects Candidate and Reference matching during the Synch state as well as comparisons made in the Comparing state. In other words, while the FPGA 205 is attempting to find the match packet in the candidate stream during the Synch state, if the match packet contains an adaptation field, the contents of adaption fields in the candidate stream are considered to be satisfactory matches if the adaption field in the match packet is the same size as the adaption field found in the candidate stream packet.

Packet Comparator Resultant Bitstreams

Possible resultant bit streams include:

A. XOR of reference stream 20 and candidate stream 22 packet payloads. The full packet header is preferably taken from the reference stream 20.

B. XOR of reference stream 20 and candidate stream 22 payload and header except for the packet header sync-byte. The MPEG packet sync byte (0x47) is preferably taken from the reference stream 20. This output stream variant preferably incorporates at least two (2) packets of reference stream context ahead and behind any segment of mismatch output data to help identify where and when the mismatch occurred. The included reference stream context data preferably does not extend the length of the output stream 270. The output stream 270 may contain match results instead of reference packets if there are fewer than four matching packets between mismatch segments.

C. XOR of reference stream 20 and candidate stream 22 payload and header. This is a "non-compliant" output in the sense that this output format does not conform to the MPEG-2 packet structure. This output stream variant incorporates at least two (2) packets of reference stream context ahead and behind any segment of mismatch output data to help identify where and when the mismatch occurred. The included reference stream context data preferably does not extend the length of the output stream 270. The output stream 270 may contain match results instead of reference packets if there are fewer than four matching packets between mismatch segments.

D. Synthesized output stream comprised of packets that record match results in place of the original payload. Packet headers are copied from the reference stream including any adaptation fields that may be present. Each packet payload may consist of, for example:

| match_information_descriptor { | | | |
|---|---|---|---|
| tag = 0xff | 8 | uimsbf | |
| descriptor_length | 8 | uimsbf | |
| Packet number | 32 | uimsbf | Count of total packets compared up to the time this packet was compared. |
| Sync byte mismatch | 1 | bslbf | 1 if sync byte failed to match |
| TEI mismatch | 1 | bslbf | |
| PUSI mismatch | 1 | bslbf | |
| Priority mismatch | 1 | bslbf | |
| Scramble mismatch | 1 | bslbf | |
| Adaptation mismatch | 1 | bslbf | |
| CC mismatch | 1 | bslbf | |
| Payload mismatch | 1 | bslbf | 1 if any part of payload has a mismatch |
| PID mismatch | 1 | bslbf | 1 if PID number mismatch |
| spare | 7 | bslbf | Always zero |
| space_loop { | | | |
|   space_length | 8 | uimsbf | Sized to take up remaining packet payload space. |
|   for (i=0; i<N;i++) { | | | |
|     spare | 8 | uimsbf | Always zero |
|   } | | | |
| } | | | |

Packet Comparator Example 1

In this example, the application selects a match packet from the incoming reference stream 20.

1. Comparator is not yet enabled. State is "Disabled".
2. Application enables packet comparator. State transitions to "Armed".
3. Connect a reference stream to the input.
4. Packet buffer FIFO fills quickly.
5. Microprocessor waits a "long" time before entering a match packet
   a. FIFO pointers shift to reflect current start and end of reference data (this is the wrapping)
6. The application finds a match packet in the incoming stream which may have been also routed to the microprocessor (see reference numeral 20a) for the purpose of selecting a match packet. The match packet plus a suitable reference mask are written to the FPGA by the application.
7. The application enables packet matching for the reference stream by setting a "Trigger" control bit. State transitions to "Matching".
8. Match packet is located in the reference stream data contained in the packet buffer FIFO. State transitions to "Synch".
   a. If not found within the maximum allowed reference packet count, the FPGA transitions to the "Match Failed" state and the packet comparator is preferably disabled and enabled to restart it.
9. Packets from both candidate and reference streams arrive
   a. Matched reference packet location moves closer to logical end of FIFO
10. If the matched reference packet is found in the candidate stream synchronization has occurred, in which case the state transitions to "Comparing".

a. If not, "Synch Failed" state is set. The packet comparator must then preferably be disabled prior to a restart.

Packet Comparator Example 2

In this example, the application has already selected a match packet and, thus, need not read it from the reference stream 20.

1. Comparator is not yet enabled. State is "Disabled".
2. Connect a reference stream to the input.
3. The match packet plus a suitable reference mask are written to the FPGA by the application.
4. Application enables packet comparator. State transitions to "Armed".
5. Application sets maximum reference stream packet compare count to zero, to enable an infinite number of reference stream packets to be compared before the match packet is found
6. Application enables packet matching for the reference stream by setting the Trigger control bit. State transitions to "Matching".
7. Packet buffer FIFO fills quickly
8. It takes a "long" time for match packet to show up in the reference stream
   a. FIFO pointers shift to reflect current start and end of reference data (this is the wrapping)
9. Match packet is located in the reference stream data contained in the packet buffer FIFO. State transitions to "Synch".
   a. If not found within the maximum allowed reference packet count, the FPGA would transition to the "Match Failed" state and the packet comparator will need to be disabled and enabled to restart it. In this example, the count was zero and there is no limit.
10. Packets from both candidate and reference streams arrive
    a. Matched reference packet location moves closer to logical end of FIFO
11. If the matched reference packet is found in the candidate stream, synchronization has occurred and the state transitions to "Comparing".
    a. If not, state transitions to "Synch Failed" state. The packet comparator would then have to be disabled and enabled to restart it.

Packet Comparator Registers

As noted, packet comparator 200, and particularly FPGA 205, includes registers block 235 in which the state of the comparator can be monitored and controlled by the application. The following table lists the several registers that are employed for a specific implementation of the present invention. Those skilled in the art will appreciate that different and/or additional registers may be desirable in light of a particular implementation.

TABLE 1

| Registers |
|---|
| Control |
|   Compare Enable |
|     Set to 1 when the application wants to enable the compare function. |
|       Transition from 0 to 1 resets the compare function and all of its status registers. |
|       Match packet and reference mask are not affected by changes in Compare Enable. |
|   Adaptation Field Compare Enable |
|     Set to 1 to enable adaptation field comparison. |
|     Set to "0" to suppress adaptation field comparisons. |
|   Compare Output Select |
|     Selects one of the available resultant streams for output. One of: |

TABLE 1-continued

| Registers |
|---|
|     None. No stream output is generated. |
|     Payload XOR: Exclusive-OR of reference stream and candidate stream packet payloads. The full packet header shall be taken from the reference stream. |
|     Payload plus Header XOR: Exclusive-OR of reference stream and candidate stream payload and header exclusive of the packet header sync-byte. The sync byte (0x47) shall be taken from the reference stream. |
|     Full XOR: Exclusive-OR of reference stream and candidate stream payload and header including the sync byte. Packets from the reference stream are placed ahead and behind any non-zero compare results. |
|     Synthetic: Synthesized output stream that reflects the match results without providing the detailed content. See compare function description text. |
|   Reference Stream FIFO Size |
|     Unsigned 17-bits. This is the maximum number of packets allowed to be stored into the reference stream packet buffer FIFO. |
|     It is also the maximum possible position difference between the reference stream and the candidate stream. |
|     During Sync state, the FPGA shall enter Synch failed state if the maximum position difference between the reference stream and the candidate stream reaches or exceeds the provisioned Reference Stream FIFO Size. |
|     A value size of 0 shall be interpreted as the maximum possible size. |
|   Reference Stream Search Depth |
|     Unsigned 32-bits. Sets the maximum number of reference packets that can be scanned while the FPGA is attempting to find the match packet in the reference stream. |
|   Match Start (Trigger) |
|     Set to 1 when the application wants to start the compare function. Once the match process is started, it can only be stopped by any one or more of: |
|       Disable the packet comparator |
|       Reference match failure |
|       Synch failure |
|     Cleared only by a change of state in "Compare Enable" |
| Statistics: |
|   Packets Compared |
|     Real-time 32-bit unsigned count of number of packets compared between the reference stream and the candidate stream. |
|       Cleared when application writes it to zero |
|       Cleared when the application writes Mismatch Packets count to zero |
|       Cleared when Match Start transitions from "0" to "1". |
|   Reference packet match delay |
|     Real-time 32-bit unsigned count of the number of packets scanned before the match packet is found in the reference stream packet buffer. |
|       Cleared when Match Start transitions from "0" to "1". |
|       Stops counting after the match packet is found in the reference stream packet buffer. |
|   Initial Sync Offset |
|     17-bit unsigned value indicating the relative packet positioning between the Reference and Candidate streams during the Sync state. |
|       Updated only during Sync state. |
|       Value is frozen and retained at exit from Sync state. |
|   Mismatched Packets |
|     Real-time 32-bit unsigned count of number of non-matching packets compared between the reference stream and the candidate stream. |
|       Only begins counting after the match packet is found in the candidate stream. |
|       Cleared when application writes it to zero |
|       Cleared when the application writes Packets Compared count to zero |
|       Cleared when Match Start transitions from "0" to "1". |
|   Contiguous Mismatched Packets |
|     Real-time 32-bit unsigned count of number of contiguous non-matching packets compared between the reference stream and the candidate stream. |
|       Only enabled to count after the matched reference packet is found in the candidate stream. |
|       Cleared when the application writes Mismatched Packets count to zero |
|       Cleared when a match occurs between reference stream and candidate stream. |
|       Cleared when Match Start transitions from "0" to "1". |
| Status: |

TABLE 1-continued

Registers

Figure 3:
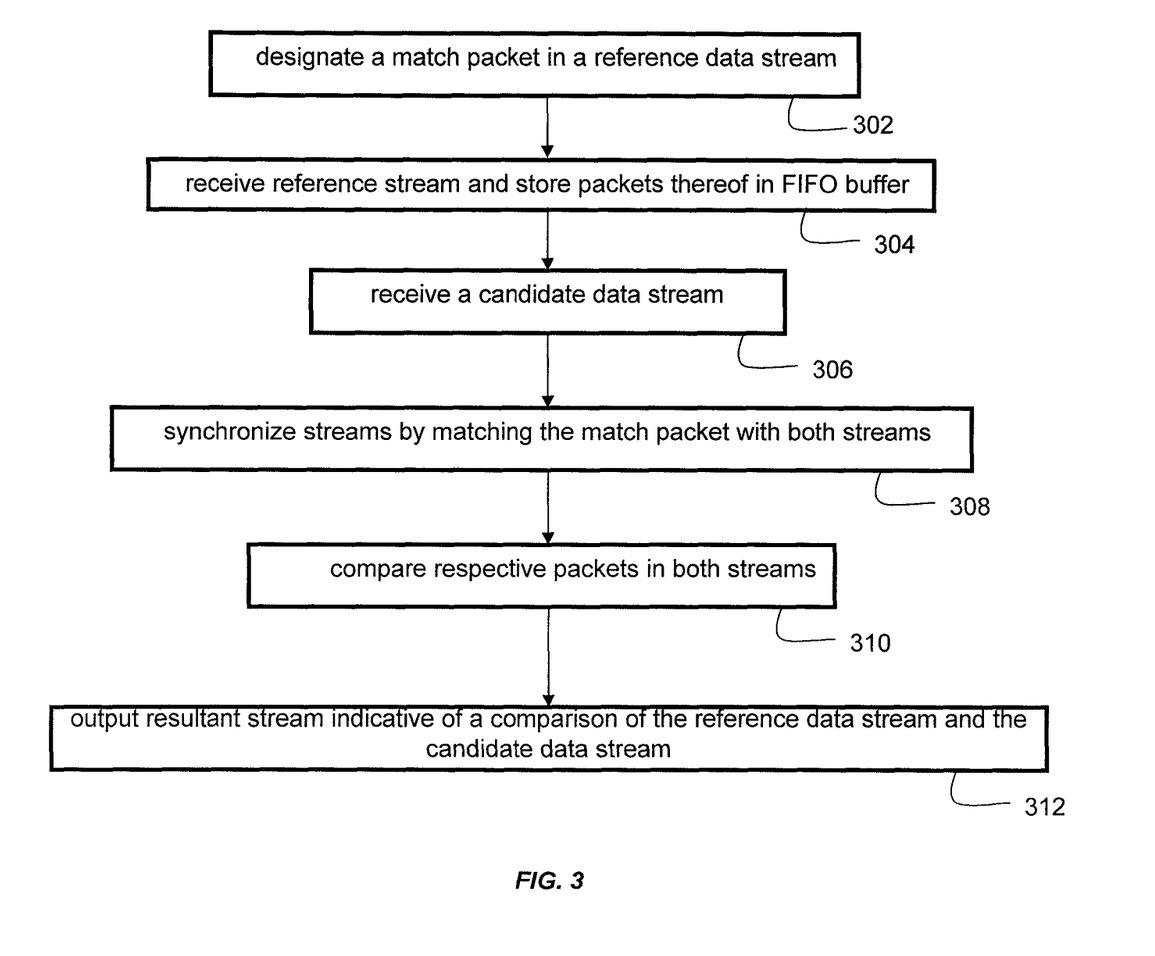
FIG. 3 is an example process for comparing packets in accordance with an embodiment of the present invention.

Current Sync Offset
    Real-time 17-bit unsigned value indicating the relative packet
    positioning between the Reference and Candidate streams.
    Valid only during "Comparing" state
Compare State
    Real-time indication of the state of the compare function. Can be read
    by the application at any time. One of:
      Disabled
        The compare function is not enabled.
      Armed
        The reference stream is being passed through the packet
        buffer FIFO. A match packet and suitable masks must
        be written by the application before the application
        advances the FPGA state by setting the "Trigger"
        control bit.
      Matching
        The compare function is searching for the match packet
        in the reference stream.
      Match Failed
        The compare function did not find the match packet in
        the reference stream buffer within the maximum time
        (packet count) allowed.
        The compare function must be disabled to clear this
        state.
      Synch
        The compare function is looking for the matched
        reference packet in the candidate stream.
      Synch failed
        The compare function did not find the matched
        reference packet in the candidate stream within the
        maximum packet count allowed.
        The compare function must be disabled to clear this
        state.
      Comparing
        The compare function is comparing the reference
        stream and the candidate stream.
Compare Status
    Match State
      Real-time status of the packet match status of the candidate
      stream and the reference stream.
      "1" when streams match
      "0" when streams do not match or not in Comparing
      state.
Compare Event Controls
    Contiguous Mismatch Threshold
      Unsigned 32-bit number of contiguous mismatched packets that are
      allowed to be counted before the stream mismatch event is triggered.
Compare Event Status
    Contains a flag for each compare event that must be uniquely signaled
    to the application
      Flags latch "1" when event occurs
      Flags reset to 0 as indicated for each event
      After flag is reset, it can be set again only if the event recurs,
      i.e. status flags are edge triggered.
      Compare Failed
        Set when any failure state is entered
        Cleared when compare function is disabled
      Compare Enabled
        Set by entry to Armed state.
          Acts as an acknowledge to the application that the
          compare function is successfully enabled.
        Cleared when application writes back a "1" bit.
      Reference Matched
        Set by entry to Synch state
        Cleared when application writes back a "1" bit.
      Compare Started
        Set by entry to Comparing state
        Cleared when application writes back a "1" bit.
      Mismatched Occurred
        Set by any mismatch between reference stream and candidate
        stream
        Cleared when application writes back a "1" bit.
      Contiguous Mismatched Threshold Reached
        Set when the number of contiguous packet mismatches
        between reference stream and candidate stream is reached
        Cleared when application writes back a "1" bit.
Compare Event Interrupt Masks
    One flag for each item in the Compare Event Status register
      Application writes "1" when interrupt is allowed
      Application writes 0 when interrupt is to be masked
Reference Stream Controls
    Discard Fragments
      "1" indicates that packet fragments in the reference stream are to be
      discarded. When discarded, the fragments are not stored into the
      packet buffer FIFO and therefore will not be attempted to be
      compared to the match packet or to a candidate stream.
      "0" indicates that packet fragments are to be processed as if they
      were whole packets. The fragment will be expanded to full packet
      size. Extra (padding) bytes added do not need to be initialized.
Reference Stream Event Flags
    Fragment detected
      Will be latched to "1" by any packet fragment detected in the
      reference stream.
        Cleared by application writing "1".
        After being cleared by the application, this bit shall not be set
        again until at least one full packet is detected in the reference
        stream. A continuous stream of fragments shall appear to the
        application as a single "fragment detected" event.
Reference Stream Interrupt Masks
    One flag for each item in the Reference Stream Event Flags register
      Application writes "1" when interrupt is allowed
      Application writes 0 when interrupt is to be masked In summary, an embodiment of the present invention provides a process, as shown in FIG. 3, including several steps. At step 302 a match packet is designated in a reference data stream. At step 304, the reference data stream is received and packets thereof are successively stored in a first in first out (FIFO) buffer. Then, at step 306, a candidate data stream including a plurality of packets is received. The two streams are then synchronized, at step 308, by finding in the two streams the match packet that was previously designated.

Thereafter, at step 310, the two streams are compared to each on a packet-by-packet, byte-by-byte, or bit-by-bit basis. Finally, at step 312, a resultant stream indicative of a comparison of the reference data stream and the candidate data stream is output for review by still another process, or by a user. In this manner, it is possible to compare the contents of two data streams in a controlled manner.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method, comprising:
designating a match packet in a reference data stream based on data in a match packet buffer;
receiving, at an input, the reference data stream and successively storing packets thereof in a first in first out (FIFO) buffer;
receiving a candidate data stream including a plurality of packets;
matching the match packet with a packet in the FIFO buffer, matching the match packet with a packet in the candidate data stream, and thereafter considering that the reference data stream and the candidate data stream are in synchronicity with one another;

thereafter, comparing respective packets in each of the reference data stream and the candidate data stream based on control information stored in memory; and outputting, at an output, packet comparison diagnostic information based on the comparison of packets in the reference data stream and the candidate data stream.

2. The method of claim 1, wherein the reference data stream and the candidate data stream are both MPEG compliant.

3. The method of claim 1, further comprising generating the candidate data stream by processing the reference data stream in a function block and then processing an output of the function block in an inverse function block.

4. The method of claim 1, wherein the comparing step comprises performing an exclusive OR (XOR) operation of payloads of respective packets from the reference data stream and the candidate data stream.

5. The method of claim 1, wherein the comparing step comprises performing an exclusive OR (XOR) operation on headers and payloads of respective packets from the reference data stream and the candidate data stream.

6. The method of claim 1, wherein the comparing step comprises performing an exclusive OR (XOR) operation on headers and payloads of respective packets from the reference data stream and the candidate data stream, except for respective packet sync bytes.

7. The method of claim 1, wherein the packet comparison diagnostic information comprises a synthesized output stream comprised of packets that record match results.

8. The method of claim 7, wherein a given packet in the synthesized output comprises the following elements:

| match_information_descriptor { | | | |
|---|---|---|---|
| tag = 0xff | 8 | uimsbf | |
| descriptor_length | 8 | uimsbf | |
| Packet number | 32 | uimsbf | Count of total packets compared up to the time this packet was compared. |
| Sync byte mismatch | 1 | bslbf | 1 if sync byte failed to match |
| TEI mismatch | 1 | bslbf | |
| PUSI mismatch | 1 | bslbf | |
| Priority mismatch | 1 | bslbf | |
| Scramble mismatch | 1 | bslbf | |
| Adaptation mismatch | 1 | bslbf | |
| CC mismatch | 1 | bslbf | |
| Payload mismatch | 1 | bslbf | 1 if any part of payload has a mismatch |
| PID mismatch | 1 | bslbf | 1 if PID number mismatch |
| spare | 7 | bslbf | Always zero |
| space_loop { | | | |
|   space_length | 8 | uimsbf | Sized to take up remaining packet payload space. |
|   for (i=0; i<N;i++) { | | | |
|   spare | 8 | uimsbf | Always zero |
| } | | | |
| } | | | |

9. The method of claim 1, wherein the match packet is taken from the reference data stream.

10. The method of claim 1, further comprising storing control information in a register block.

11. The method of claim 1, further comprising suppressing the step of comparing for adaptation fields in MPEG compliant packets.

12. The method of claim 1, further comprising controlling the method using a software application.

13. The method of claim 1, further comprising detecting and storing a latency delay between the reference data stream and the candidate data stream.

14. A method, comprising:

designating a match packet in a reference stream based on data in a match packet buffer;

receiving the reference stream including the match packet at an input;

detecting the match packet in the reference stream based on control information stored in memory;

detecting the match packet in a candidate stream, based on the control information, wherein the candidate stream is a processed version of the reference stream and is delayed in time with respect to the reference stream;

upon detection of the match packet in both the reference stream and the candidate stream, changing a register state to a synchronization state;

when in the synchronization state, comparing, based on the control information respective individual packets in the reference stream and the candidate stream to each other; and outputting, at an output, packet comparison diagnostic information based on the comparison of the respective individual packets in the reference stream and the candidate stream.

15. The method of claim 14, wherein the reference data stream and the candidate data stream are both MPEG compliant.

16. The method of claim 14, wherein the comparing step comprises performing an exclusive OR (XOR) operation of payloads of respective packets from the reference stream and the candidate stream.

17. The method of claim 14, wherein the comparing step comprises performing an exclusive OR (XOR) operation on headers and payloads of respective packets from the reference stream and the candidate stream.

18. The method of claim 14, wherein the comparing step comprises performing an exclusive OR (XOR) operation on headers and payloads of respective packets from the reference stream and the candidate stream, except for respective packet sync bytes.

19. The method of claim 14, wherein the packet comparison diagnostic information comprises a synthesized output stream comprised of packets that record match results.

20. A system, comprising:

a microprocessor;

a packet comparator that is configured to be controlled by the microprocessor via a set of registers;

the packet comparator having a first input configured to receive a reference stream, a second input configured to receive a candidate stream, and an output configured to supply diagnostic information;

the packet comparator further comprising:

a match packet buffer configured to receive a match packet and supply the same to modules for detecting the match packet in both the reference stream and the candidate stream; and a compare module configured to compare respective individual packets in the reference stream and the candidate stream to each other, and to output the diagnostic information based on the comparison of the respective individual packets in the reference stream and the candidate stream.

21. The system of claim 20, wherein the packet comparator is implemented with a field programmable gate array (FPGA).

22. The system of claim 20, wherein the reference stream and the candidate stream are MPEG compliant streams.

23. The system of claim 20, further comprising a first in first out (FIFO) buffer configured to store the reference stream and advance the same until the match packet is detected.

24. The system of claim 20, wherein the diagnostic information comprises a result of an exclusive OR (XOR) operation performed on payloads of respective packets from the reference stream and the candidate stream.

25. The system of claim 20, wherein the diagnostic information comprises a result of an exclusive OR (XOR) operation performed on headers and payloads of respective packets from the reference stream and the candidate stream.

26. The system of claim 20, wherein the diagnostic information comprises a result of an exclusive OR (XOR) operation on headers and payloads of respective packets from the reference stream and the candidate stream, except for respective packet sync bytes.

27. The system of claim 20, wherein the diagnostic information comprises a synthesized output stream comprised of packets that record match results.

* * * * *